Julius Vom Hofe's Imp.d Fishing Reel.

No. 71344

PATENTED NOV 26 1867

Witnesses:
Gustav Berg
Hermann Gros

Inventor:
J. Vom Hofe
per
Van Santvoord & Hauff
Atty

United States Patent Office.

JULIUS VOM HOFE, OF BROOKLYN, E. D., NEW YORK.

Letters Patent No. 71,344, dated November 26, 1867.

---

IMPROVED FISHING-REEL.

---

The Schedule referred to in these Letters Patent and making part of the same.

---

TO ALL WHOM IT MAY CONCERN:

Be it known that I, JULIUS VOM HOFE, of No. 230 Graham avenue, Brooklyn, Eastern District, in the county of Kings, and in the State of New York, have invented a new and useful Improvement in Fishing-Reels; and I do hereby declare that the following is a full, clear, and exact description thereof, which will enable those skilled in the art to make and use the same, reference being had to the accompanying drawing, forming part of this specification, in which drawing—

Similar letters indicate corresponding parts.

Figure 1:
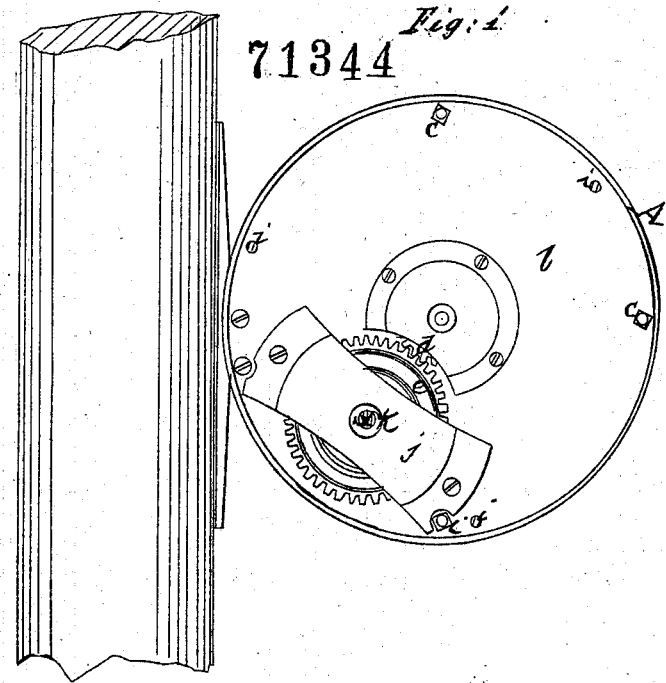
Figure 1 represents an end view of this invention.
Figure 2:
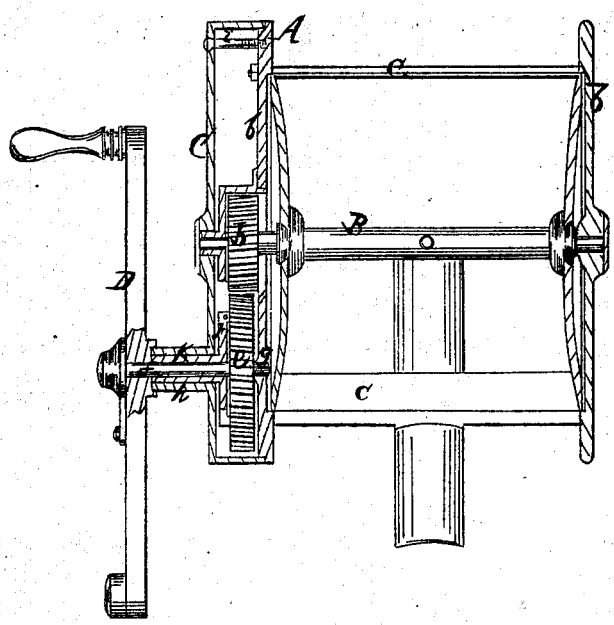
Figure 2 is a central section thereof.

This invention consists in the arrangement of a bridge with a long tubular bearing, in combination with the driving-shaft, and with the plate which forms the step of said driving-shaft, said bridge being used in addition to the cap which usually forms the bearing for the shaft, in such a manner that both bearings of the driving-shaft are rigidly connected to one and the same plate, and consequently said bearings are not thrown out of line when the cap is screwed down, and the shaft is not liable to bind or to rattle.

A represents the frame of my reel, said frame being composed of two plates or disks $a$ $b$, which are connected by tie-rods $c$, and which form the bearings for the gudgeons of the reel B. One of these gudgeons extends through the disk $b$, and on its end is mounted a pinion, $d$, which gears into a cog-wheel, $e$, mounted on the driving-shaft $f$. In ordinary fishing-reels this driving-shaft is stepped at one end in a socket, $g$, in the disk $b$, and its other end has its bearing in a tubular projection, $h$, of the cap C. This cap is secured to the disk $b$, by means of three or more screws $i$, and if these screws are not screwed up with great care, the bearing $h$ is liable to bind on the shaft, and said shaft is caused to run hard or the bearing must be relieved, and then the shaft is liable to rattle. This difficulty is avoided by the arrangement of a bridge, $j$, which is rigidly secured to the disk $b$, and which is provided with a tubular projection, $k$, to form the bearing for the shaft $f$. This bridge, when screwed down, is not liable to cause the shaft to bind, and said shaft can be fitted into the bearing $k$ so nicely that it runs perfectly free without rattling. The tubular projection $h$ of the cap, can either be dispensed with, or it may be bored out to fit over the tube R, as shown in the drawing. The handle D is secured to the end of the shaft $f$ in the usual manner.

By this arrangement I am enabled to produce a fishing-reel which runs perfectly free, and which is not liable to rattle.

What I claim as new, and desire to secure by Letters Patent, is—

The bridge $j$, in combination with the disk $b$, shaft $f$, and cap C, substantially as and for the purpose described.

JULIUS VOM HOFE.

Witnesses:
   W. HAUFF,
   GUSTAV BERG.